United States Patent
Zaag et al.

(10) Patent No.: US 11,757,116 B1
(45) Date of Patent: Sep. 12, 2023

(54) DYNAMIC ADJUSTMENT OF CURRENT OR POWER DRAW FOR FUEL CELL APPLICATIONS WITH ENHANCED TRANSIENT CAPABILITIES

(71) Applicant: HYDROGENICS CORPORATION, Mississauga (CA)

(72) Inventors: Nader Zaag, Milton (CA); Sonia Sorbera, Woodbridge (CA); Hing Yan Edmond Chan, Maple (CA); Chun Yu, Mississauga (CA)

(73) Assignee: HYDROGENICS CORPORATIONS, Mississauga (CA)

( * ) Notice: Subject to any disclaimer, the term of this patent is extended or adjusted under 35 U.S.C. 154(b) by 0 days.

(21) Appl. No.: 18/324,748

(22) Filed: May 26, 2023

Related U.S. Application Data

(60) Provisional application No. 63/351,214, filed on Jun. 10, 2022.

(51) Int. Cl.
| | |
|---|---|
| *H01M 8/04858* | (2016.01) |
| *H01M 8/04223* | (2016.01) |
| *H01M 8/0432* | (2016.01) |
| *H01M 8/04537* | (2016.01) |
| *H01M 8/04701* | (2016.01) |

(52) U.S. Cl.
CPC ....... *H01M 8/0494* (2013.01); *H01M 8/0491* (2013.01); *H01M 8/04231* (2013.01); *H01M 8/04358* (2013.01); *H01M 8/04559* (2013.01); *H01M 8/04589* (2013.01); *H01M 8/04619* (2013.01); *H01M 8/04723* (2013.01)

(58) Field of Classification Search
CPC ........... H01M 8/0494; H01M 8/04231; H01M 8/04358; H01M 8/04559; H01M 8/04589; H01M 8/04619; H01M 8/04723; H01M 8/0491

USPC .......................................................... 429/400
See application file for complete search history.

(56) References Cited

U.S. PATENT DOCUMENTS

| | | | |
|---|---|---|---|
| 6,692,851 B2 | 2/2004 | Keskula et al. | |
| 8,105,724 B2 | 1/2012 | Xu et al. | |
| 8,642,220 B2 | 2/2014 | Zhang et al. | |
| 9,196,915 B2 | 11/2015 | Kawahara et al. | |
| 9,444,113 B2 | 9/2016 | Matsusue | |
| 9,469,197 B2 | 10/2016 | Ryu et al. | |
| 10,199,669 B2 | 2/2019 | Wang et al. | |
| 2006/0234092 A1* | 10/2006 | Thompson | H01M 8/04268 429/429 |
| 2008/0076012 A1* | 3/2008 | Lienkamp | H01M 8/04992 429/65 |
| 2011/0014535 A1* | 1/2011 | Choi | H01M 8/04671 429/432 |
| 2011/0076582 A1* | 3/2011 | Zhang | H01M 8/0432 429/432 |
| 2020/0136159 A1 | 4/2020 | Bowman | |

FOREIGN PATENT DOCUMENTS

WO      2006006224      1/2006

* cited by examiner

*Primary Examiner* — Christian Roldan
(74) *Attorney, Agent, or Firm* — Barnes & Thornburg LLP

(57) ABSTRACT

A system includes a fuel cell stack and a controller. The controller is configured to determine a current density of the fuel cell stack, determine a threshold voltage value, and compare a measured average fuel cell voltage value and the threshold voltage value. The controller is configured to set an allowed current and power draw of the fuel cell stack.

20 Claims, 9 Drawing Sheets

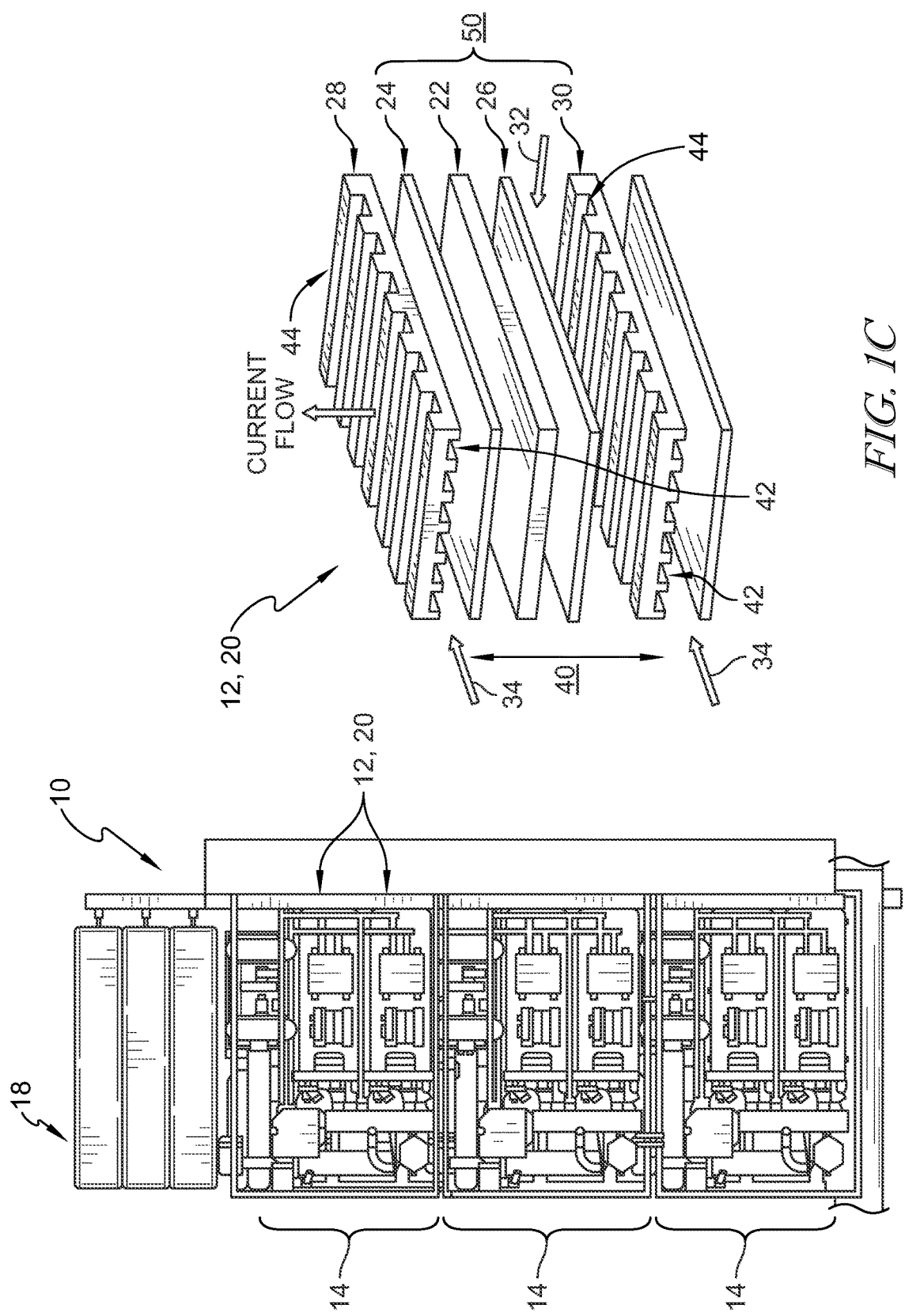

DYNAMIC ADJUSTMENT OF CURRENT OR POWER DRAW FOR FUEL CELL APPLICATIONS WITH ENHANCED TRANSIENT CAPABILITIES

CROSS-REFERENCE TO RELATED APPLICATIONS

This non-provisional application claims the benefit and priority, under 35 U.S.C. § 119(e) and any other applicable laws or statutes, to U.S. Provisional Patent Application Ser. No. 63/351,214 filed Jun. 10, 2022, the entire disclosure of which is hereby expressly incorporated herein by reference.

TECHNICAL FIELD

The present disclosure generally relates to a dynamic adjustment of a permitted current or power draw in fuel cell applications having enhanced transient capabilities.

BACKGROUND

Systems and methods of the present disclosure provide for controlling a fast transient current in fuel cell systems. In one example, the system for controlling a fast transient current includes a fuel cell control system configured to communicate a predefined allowed (or permitted) current and/or power draw value to one or more controllers, subsystems, or other "end users" to which those controllers, subsystems, or other "end users" may adhere. Put another way, upon receipt by the end users of a signal or command from the control system indicating a predefined allowed current and/or power draw value or threshold, the end users may be configured to issue current and/or power draw requests based on the received predefined allowed current and/or power draw value or threshold.

SUMMARY

Embodiments of the present invention are included to meet these and other needs.

In one aspect, described herein, a system comprises a fuel cell stack including a plurality of fuel cells and a controller. The controller is configured to determine a current density of the fuel cell stack, determine a threshold voltage value based on a polarization curve of the fuel cell stack, and compare a measured average fuel cell voltage value and the threshold voltage value. The controller is configured to, in response to the measured average fuel cell voltage value being greater than the threshold voltage value, set an allowed current and power draw of the fuel cell stack at a first predefined threshold value. The controller is configured to in response to the measured average fuel cell voltage value being less than the threshold voltage value, set the allowed current and power draw of the fuel cell stack at a second predefined threshold value. The first predefined threshold value is greater than the second predefined threshold value.

In some embodiments, the polarization curve of the fuel cell stack may be determined at the time of manufacturing of the fuel cell stack. In some embodiments, in response to a measured minimum fuel cell voltage being less than a minimum threshold voltage value, the fuel cell stack may enter a recovery state. In some embodiments, after entering the recovery state, the controller may be configured to determine whether the allowed current and power draw of the fuel cell stack is greater than a threshold current value.

In some embodiments, in response to the allowed current and power draw of the fuel cell stack being greater than the threshold current value, the controller may be configured to set a ramp down rate to periodically lower the allowed current and power draw of the fuel cell stack. In some embodiments, in response to the allowed current and power draw of the fuel cell stack being less than the threshold current value, the controller may be configured to lower the allowed current and power draw of the fuel cell stack. In some embodiments, after entering the recovery state, the controller may be configured to increase an air flow to the fuel cell stack.

According to a second aspect, described herein, a method comprises providing a fuel cell stack including a plurality of fuel cells and a controller communicatively coupled to the fuel cell stack, determining a current density of the fuel cell stack, determining a threshold voltage value, comparing a measured average fuel cell voltage value to the threshold voltage value. In response to the measured average fuel cell voltage value being greater than the threshold voltage value, the method comprises setting an allowed current and power draw of the fuel cell stack at a first predefined value. In response to the measured average fuel cell voltage value being less than the threshold voltage value, the method comprises setting the allowed current and power draw of the fuel cell stack at a second predefined value, wherein the first predefined value is greater than the second predefined value. The method further comprises measuring a coolant temperature of the fuel cell stack.

In some embodiments, the threshold voltage value may be determined using a polarization curve of the fuel cell stack statistically determined at the time of manufacturing of the fuel cell stack. In some embodiments, the method may further comprise, in response to the coolant temperature of the fuel cell stack being greater than a first threshold temperature value, setting the allowed current and power draw of the fuel cell stack to zero.

In some embodiments, the method may further comprise, in response to the coolant temperature of the fuel cell stack being less than the first threshold temperature value and being greater than a second threshold temperature value, wherein the second threshold temperature value is less than the first threshold temperature value, lowering the allowed current and power draw of the fuel cell stack. In some embodiments, the method may further comprise, in response to the coolant temperature of the fuel cell stack being less than the first threshold temperature value and the second threshold temperature value, maintaining the allowed current and power draw of the fuel cell stack.

In some embodiments, lowering the allowed current and power draw of the fuel cell stack may include calculating a product of a maximum fuel cell stack current and a ratio of a difference between the coolant temperature and the second threshold temperature value and a difference between the first threshold temperature value and the second threshold temperature value.

According to a third aspect, described herein, a method comprises providing a fuel cell stack and a controller in communication with the fuel cell stack, determining a current density of the fuel cell stack, determining a first minimum threshold voltage value of the fuel cell stack, determining an ambient temperature threshold, determining a coolant temperature set point of the fuel cell stack based on the current density of the fuel cell stack, comparing a measured minimum fuel cell voltage value to the first minimum threshold voltage value. The method further comprises, in response to the measured minimum fuel cell voltage value being less than the first minimum threshold voltage value and an ambient temperature being less than the ambient temperature threshold, increasing the coolant temperature set point of the fuel cell stack by a predefined value to correspond to an increased coolant temperature set point. The method further comprises, in response to the measured minimum fuel cell voltage value being greater than the first minimum threshold voltage value or the ambient temperature being greater than the ambient temperature threshold, maintaining the coolant temperature set point.

In some embodiments, the method may further comprise determining if an efficiency of the fuel cell stack improved after the coolant temperature set point is increased to the increased coolant temperature set point. In some embodiments, the efficiency of the fuel cell stack may improve if a measured minimum fuel cell voltage of the fuel cell stack at the increased coolant temperature set point is greater than a second minimum threshold voltage value, the second minimum threshold voltage value being greater than first minimum threshold voltage value.

In some embodiments, the method may further comprise lowering the increased coolant temperature set point to the coolant temperature set point if the efficiency of the fuel cell stack improved. In some embodiments, the method may further comprise determining a purge valve open time period, a purge valve close time period, and a threshold voltage variance based on a lookup table including current density values.

In some embodiments, the method may further comprise determining a difference between a measured maximum fuel cell voltage and the measured minimum fuel cell voltage, and in response to the difference between the measured maximum fuel cell voltage and the measured minimum fuel cell voltage being greater than the threshold voltage variance, increasing the purge valve open time period and decreasing the purge valve close time period. In some embodiments, the method may further comprise, in response to the difference between the measured maximum fuel cell voltage and the measured minimum fuel cell voltage being less than the threshold voltage variance, operating a purge valve based on the purge valve open time period and the purge valve close time period.

BRIEF DESCRIPTION OF THE DRAWINGS

The detailed description particularly refers to the following figures, in which:

FIG. 1B is a cutaway view of an exemplary fuel cell system including an air delivery system, hydrogen delivery systems, and a plurality of fuel cell modules each including multiple fuel cell stacks;

FIG. 1C is a perspective view of an exemplary repeating unit of a fuel cell stack of the fuel cell system of FIG. 1A;

DETAILED DESCRIPTION

Figure 1A:
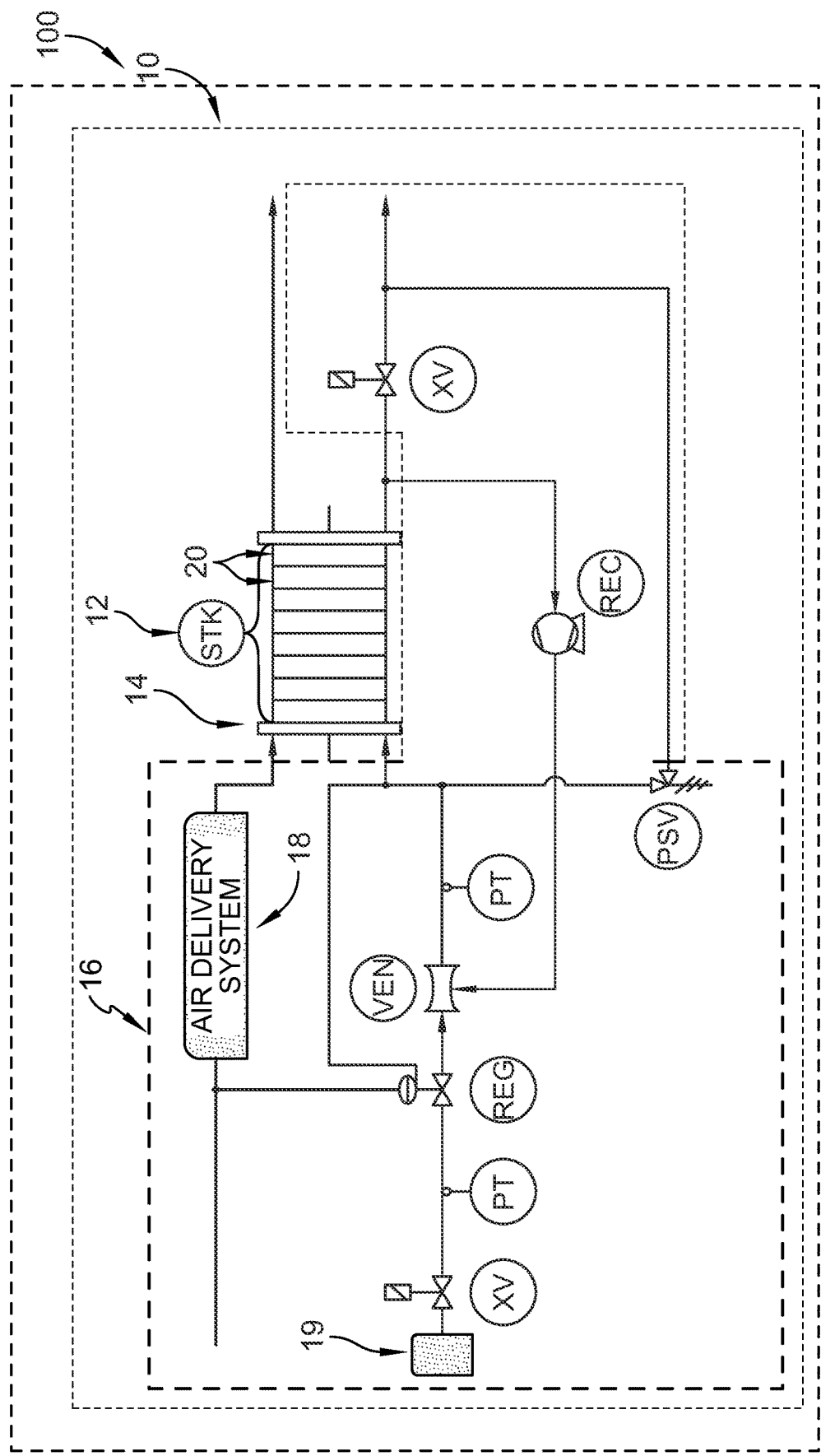
FIG. 1A is a schematic view of an exemplary fuel cell system including an air delivery system, a hydrogen delivery system, and a fuel cell module including a stack of multiple fuel cells.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
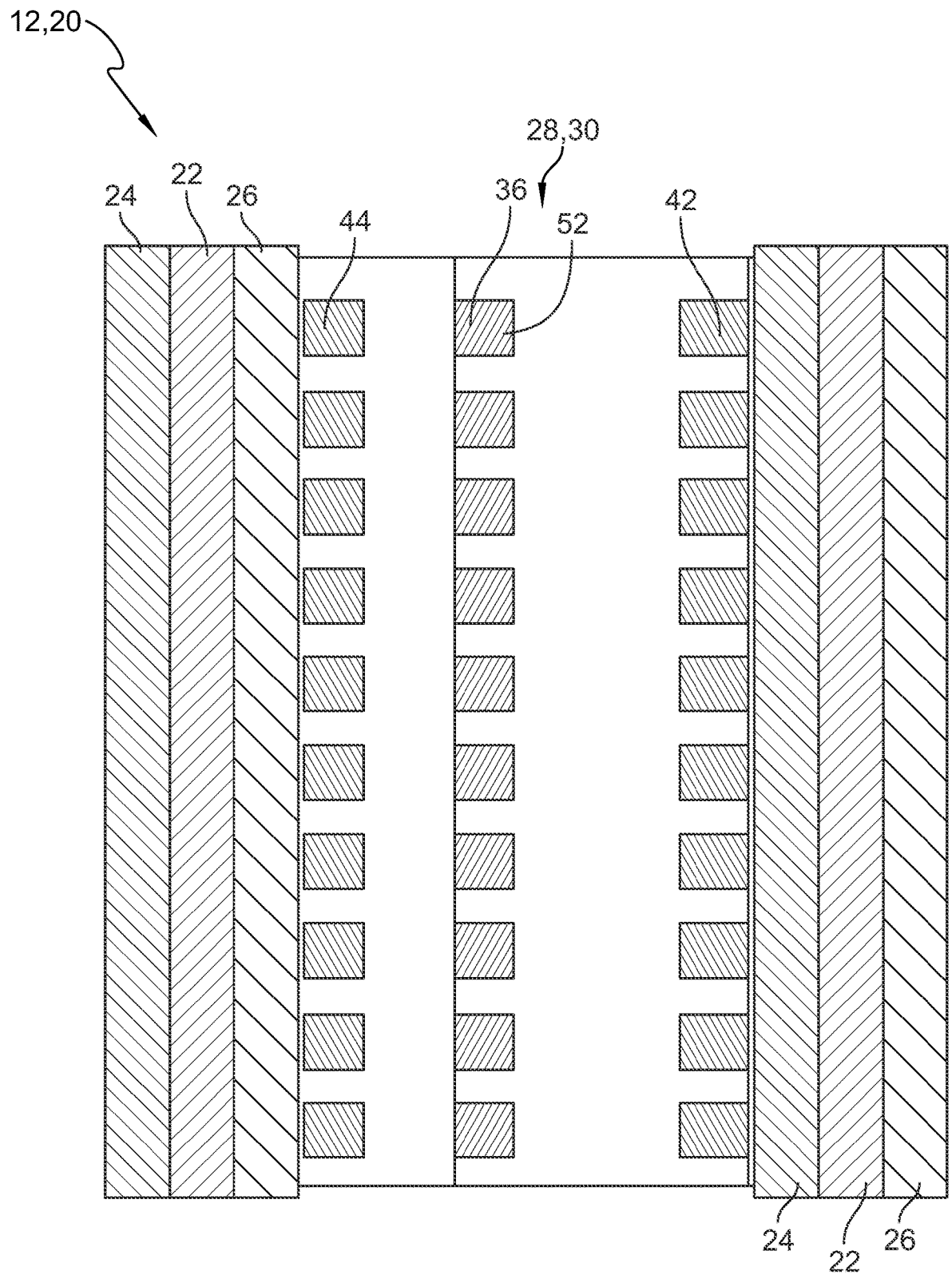
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

In an example, a fuel cell system controller 102 consistent with the present disclosure may determine a predefined allowed (or permitted) current and/or power draw based on a measured or estimated flow rate of air 34 and fuel (e.g., hydrogen) 32 to the fuel cell 20 and/or based on a measured or estimated temperature of the fuel cell 20 and/or a measured or estimated feedback voltage of the fuel cell 20.

The fuel cell system controller 102 is configured to determine the allowed current and/or power draw by applying one or more algorithms to one or more components of the fuel cell system 10 based on a function of that component in the fuel cell system 10. As one example, the fuel cell system controller 102 may be configured to dynamically adjust the allowed current and/or power draw based on an overall operating status of the fuel cell stack 12. As another example, the fuel cell system controller 102 may be configured to dynamically adjust the allowed current and/or power draw based on a recovery voltage of one or more fuel cells 20 of the fuel cell stack 12. As still another example, the fuel cell system controller 102 may be configured to dynamically adjust the allowed current and/or power draw based on the measured or estimated temperature of the fuel cell 20 and/or the fuel cell stack 12.

Additionally or alternatively, in response to dynamically adjusting the allowed current and/or power draw of the fuel cell 20 and/or the fuel cell stack 12, the fuel cell system controller 102 may be configured to initiate one or more operations of one or more components of the fuel cell system 10 to ensure recovery and improve operation of the fuel cell 20 and/or the fuel cell stack 12. In some instances, upon completing the one or more initiated recovery or remediation operations, the fuel cell system controller 102 again dynamically adjusts the allowed current and/or power draw of the fuel cell 20 and/or the fuel cell stack 12. Example recovery operations initiated by the fuel cell system controller 102 may include adjusting a coolant temperature set point, adjusting operating duty cycle of a purge valve, and so on. While "active" recovery operations such as adjusting the coolant temperature set point and adjusting the operating duty cycle of the purge valve are described, the present disclosure is not limited thereto. One or more recovery operations may include "passive" operations, such as, for example, waiting a predefined period of time prior to allowing current and/or power draw to occur within a given fuel cell 20 or a fuel cell stack 12. Of course, it is readily understood that one or more passive operations may include one or more active steps, such as actively preventing current and/or power draw from occurring prior to the elapsing of the predefined period of time and so on.

Figure 2:
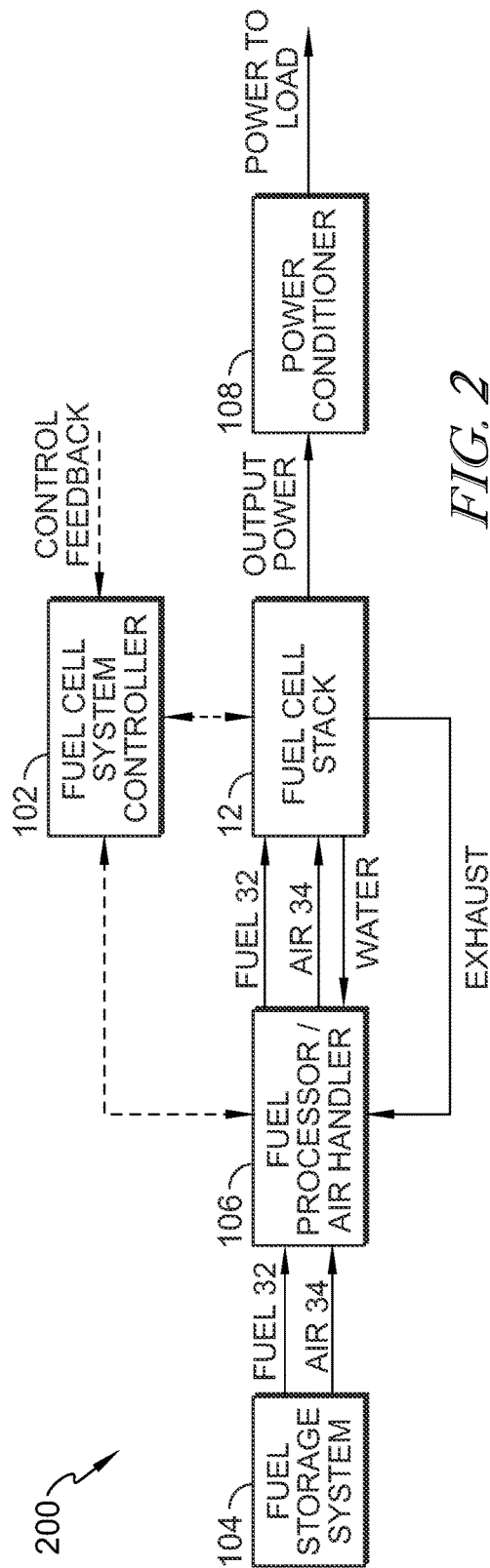
FIG. 2 illustrates an example fuel cell system including a fuel cell system controller and the fuel cell stack of FIG. 1C.

FIG. 2 illustrates an example fuel cell system 200, similar to the fuel cell system 10 described in reference to FIGS. 1A-1D, including the fuel cell system controller 102. The fuel cell system controller 102 may be configured to monitor and control operation of one or more components of the fuel cell system 200. For example, the fuel cell system controller 102 may be communicatively coupled to and configured to monitor and control operation of a fuel cell fuel storage system 104, the fuel cell stack 12, a fuel processor/air handler 106, and/or a power conditioner 108.

The fuel processor/air handler 106 is configured to receive fuel cell fuel (e.g., hydrogen or compressed natural gas (CNG)) 32 and air 34 from the fuel cell fuel storage system 104 and provide the same to the fuel cell stack 12. The fuel cell stack 12 uses a chemical process to generate electrical energy and/or power that the fuel cell stack 12 outputs to the power conditioner 108. While not separately illustrated, the electrical energy generated by the fuel cell stack 12 may be stored in one or more battery packs for use by one or more propulsion or non-propulsion components (e.g., a load) coupled to the fuel cell system 200.

The power conditioner 108 may be configured to step up DC power output by the fuel cell stack 12 to a voltage compatible with the electrical loads. Additionally or alternatively, the power conditioner 108 may be configured to invert DC power supplied by the fuel cell stack 12 to AC power compatible with an AC load coupled thereto.

Performance of the fuel cell 20 may be determined or described by a current-voltage operating dependency of that fuel cell 20. The current-voltage operating dependency of the fuel cell 20 may exemplify a nonlinear relationship, due to kinetics, of an electrochemical reaction of hydrogen 32 and oxygen 34 within the fuel cell 20. In some instances, the current-voltage operation dependency of the fuel cell 20 may be described using a current-voltage curve (i.e., an I-V curve), also referred to as a polarization curve. The polarization curve of a given fuel cell 20 is statistically determined at the time of manufacturing of the given fuel cell 20. At the time of manufacturing, a voltage range is known for a given output current of the fuel cell 20, and these values produce the polarization curve of the fuel cell 20.

Figure 3:
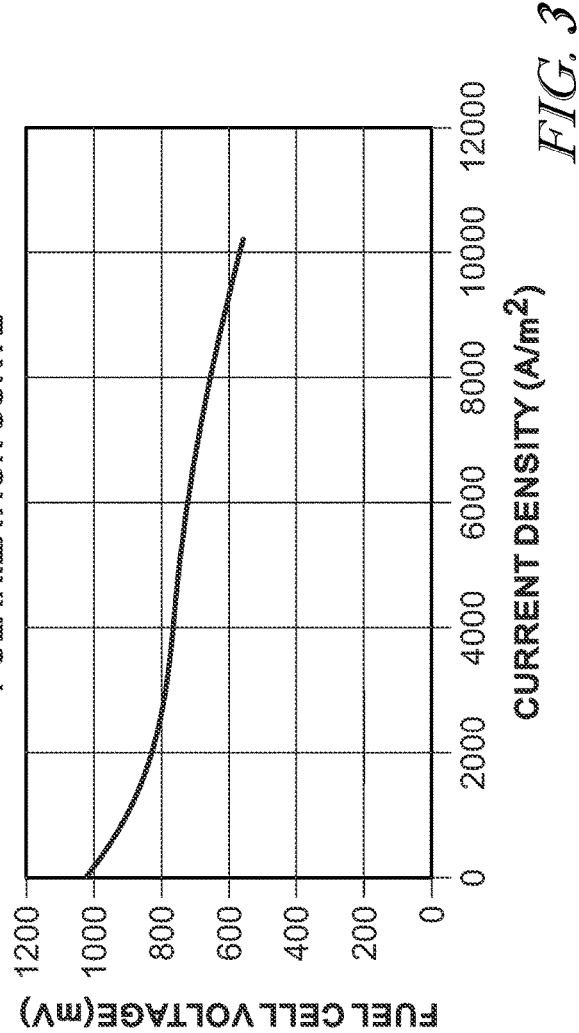
FIG. 3 illustrates an example polarization curve of the fuel cell stack of FIGS. 1A-1D.

FIG. 3 illustrates an exemplary polarization curve that plots voltage output values of the fuel cell 20 relative to corresponding current density loading values. In this regard, current density is defined by dividing an electrical current produced by the fuel cell 20 in the active area 40 of the membrane electrode assembly (MEA) 22 of that fuel cell 20.

Figure 4:
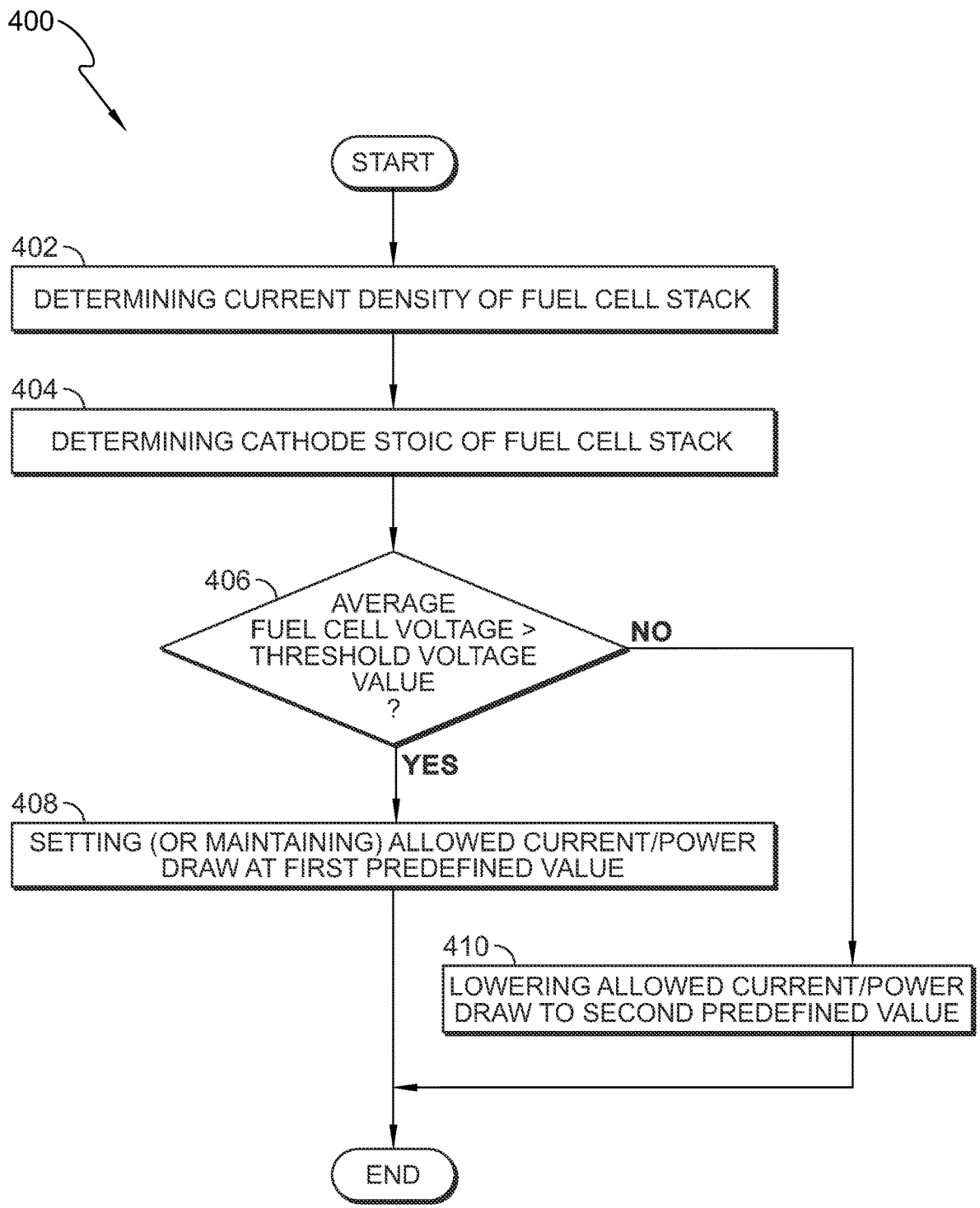
FIG. 4 illustrates an example process for dynamically adjusting an allowed current and power draw based on an average fuel cell voltage of the fuel cells of the fuel cell stack of FIGS. 1A-1D.

FIG. 4 illustrates an example process 400 for the dynamic adjustment of the allowed current and/or power draw of the fuel cell stack 12 based on a status of one or more operating parameters of the fuel cell stack 12, such as the temperature of the fuel cell stack 12, the output voltage of the fuel cell stack 12, and/or the output current of the fuel cell stack 12. One or more operations of the process 400 may be performed by the fuel cell system controller 102 described at least in reference to FIG. 2.

In general, fuel cells 20 follow the polarization curve with a given known voltage range for a given output current. The fuel cell system controller 102 is configured to use the corresponding polarization curve of the fuel cells 20 to determine what the voltage range should be for a given output current. In some instances, if the fuel cell system 200 is loaded too quickly (such as, for example, if a current and/or power draw applied to the fuel cell stack 12 is greater than a predetermined threshold value), the fuel cell stack 12 may experience "fuel starvation" and the output voltage of the fuel cells 20 of the fuel cell stack 12 for a given current level may be lower than the output voltage expected based on the corresponding polarization curve of the fuel cells 20. Operating under fuel starvation conditions may be detrimental to an operating life cycle of the fuel cell stack 12 or may cause the fuel cell stack 12 to exhibit degraded performance during its life.

In order to prevent fuel starvation, the fuel cell system controller 102 of the present disclosure may be configured to apply one or more algorithms directed to dynamically adjusting the allowed current and/or power draw from the fuel cell stack 12. For example, the fuel cell system controller 102 may apply an equation or a lookup table corresponding to the polarization curve of the fuel cells 20 of the fuel cell stack 12. The lookup table may be a 2D or a 3D lookup table, with the lookup table including values for the temperature of the fuel cell stack 12, the output voltage of the fuel cell stack 12, and/or the output current of the fuel cell stack 12. The equation and/or the lookup table may be utilized to lower the allowed ramp rate of the current and/or power draw in order to prevent or minimize the occurrence of fuel starvation in a ratio-metric manner. If the operation of the fuel cell stack 12 is reaching an unhealthy level, the equation and/or the lookup table may indicate that the allowed current and/or power draw should be lowered.

In some instances, the fuel cell system controller 102 may be configured to continuously monitor and evaluate purge valve and cathode stoic tables. Purge valve and cathode stoic tables continue to be updated by the fuel cell system controller 102 according to a state of life factor (which can be expressed as a % of state of life) for the fuel cell stack 12. In other words, a 3D lookup table based on the state of life where the state of life is determined by comparison against a polarization curve may be used, where the additional third axis may be the state of life factor.

Process 400 dynamically adjusts the allowed current and/or power draw of the fuel cell stack 12 based on an average fuel cell voltage of the fuel cells 20 of the fuel cell stack 12. The process 400 may begin at block 402 where the fuel cell system controller 102 determines a current density of the fuel cell stack 12. The current density of the fuel cell stack 12 is calculated as described above. The fuel cell system controller 102, at block 404, determines a cathode stoic of the fuel cell stack 12 based on the current density of the fuel cell stack 12 determined in block 402. At block 404, the fuel cell system controller 102 uses a cathode stoic lookup table, where different current densities correspond to different cathode stoics. Using the determined current density from block 402, the fuel cell system controller 102 determines the cathode stoic.

At block 406, the fuel cell system controller 102 determines a threshold voltage value based on an equation and/or a lookup table including one or more fuel cell stack 12 operating parameter values, such as the current output of the fuel cell stack 12. Based on the operating parameter values, the fuel cell system controller 102 determines the threshold voltage value. In one example, the fuel cell system controller 102, at block 406, determines whether an average fuel cell voltage of the fuel cells 20 of the fuel cell stack 12 is greater than the threshold voltage value that was determined based on the equation and/or the lookup table. In other examples, the fuel cell system controller 102 may be configured to use a variance of the voltage difference of the fuel cell stack 12 or another parameter or a combination of parameters as representative of an overall fuel cell stack 12 status.

In response to the average fuel cell voltage of the fuel cells 20 of the fuel cell stack 12 being greater than the threshold voltage value, the fuel cell system controller 102, at block 408, sets or maintains the allowed current and/or power draw at a first predefined value. The fuel cell system controller 102 uses the corresponding polarization curve of the fuel cells 20 of the fuel cell stack 12 and the determined current density and the cathode stoic of the fuel cell stack 12 to determine the first predefined value. For example, the first predefined value may be the allowed current and/or power draw determined from one or more equations or lookup tables representative of the polarization curve of the fuel cells 20 of the fuel cell stack 12.

In response to the average fuel cell voltage of the fuel cells 20 being less than the threshold voltage value, the fuel cell system controller 102 is configured to, at block 410, determine a lower allowed current and/or power draw. The lower allowed current and/or power draw is a second predefined value that is less than the first predefined value. In other words, if the average fuel cell voltage of the fuel cells 20 of the fuel cell stack 12 is less than the threshold voltage value (e.g., less than expected), then the allowed current and/or power draw is lowered. The process 400 may then end.

Figure 5:
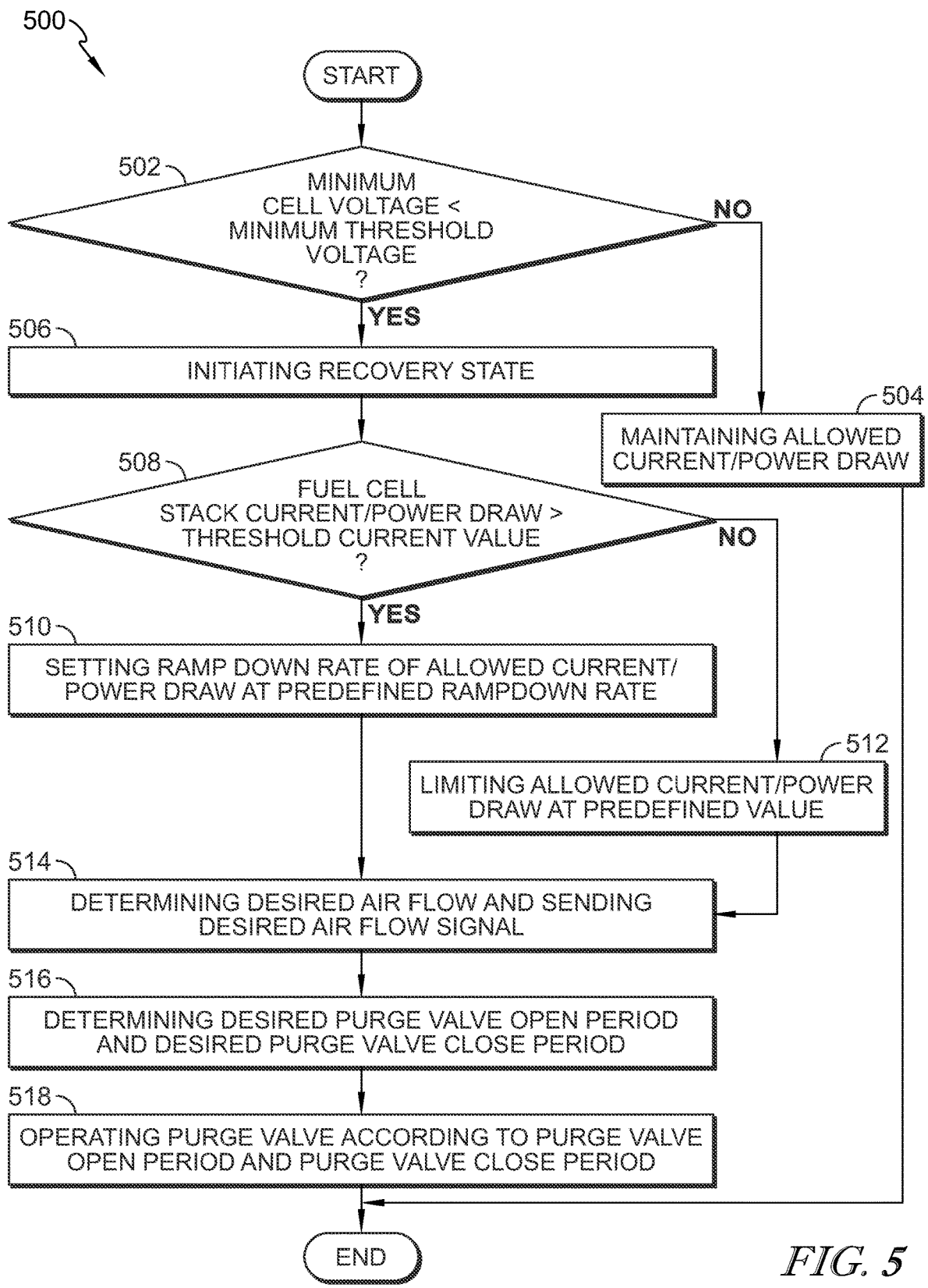
FIG. 5 illustrates an example process for dynamically adjusting a ram down rate of an allowed current and power draw during a recovery state of the fuel cells of the fuel cell stack of FIGS. 1A-1D.

FIG. 5 illustrates an example process 500 for the dynamic adjustment of a ramp down rate of the allowed current and/or power draw during a recovery state of the fuel cells 20 of the fuel cell stack 12. As described in reference to FIG. 4, if the fuel cell system 200 is loaded too quickly, the fuel cell stack 12 may experience "fuel starvation", such that an output voltage for a given current level may be lower than expected based on the typical polarization curve for the given fuel cells 20 of the fuel cell stack 12. In some instances, the fuel starvation occurrence in the fuel cell stack 12 may be indicated by the voltage of one or more fuel cells 20 of the fuel cell stack 12 being less than a minimum threshold voltage. Accordingly, the fuel cell system controller 102 may be configured to dynamically adjust the allowed current and/or power draw based on the measured or estimated voltage of one or more fuel cells 20 of the fuel cell stack 12.

In one example, the fuel cell system controller 102, at block 502, determines whether a minimum voltage of one or more fuel cells 20 of the fuel cell stack 12 is less than the minimum threshold voltage. As just one example, the minimum threshold voltage may range from about 0.1 V to about 0.5 V, such as 0.1 V, 0.2 V, 0.3 V, 0.4 V, or any other value, including any specific number or range of voltage comprised therein. In response to determining, at block 502, that the minimum voltage of one or more fuel cells 20 is greater than the minimum threshold voltage, the fuel cell system controller 102, at block 504, operates the fuel cell system 200 to maintain the allowed current and/or power draw as defined, for example, in the process 400 described in reference to FIG. 4. The fuel cell system controller 102 may then exit the process 500 as the fuel cell stack 12 does not need to enter the recovery state.

In response to determining at block 502 that the minimum voltage of one or more fuel cells 20 is less than the minimum threshold voltage, the fuel cell system controller 102 may initiate, at block 506, entering the recovery state. Put another way, the fuel cell system controller 102 is configured to enter the recovery state in response to the minimum voltage of the fuel cells 20 of the fuel cell stack 12 being less than the minimum threshold voltage, such as 0.1 V, 0.2 V, 0.3 V, 0.4 V, or any deviation of average cell voltage, such as minimum cell voltage or a deviation of maximum and/or minimum cell voltage within the fuel cell stack 12 from a predefined maximum and/or minimum voltage value.

At block 508, the fuel cell system controller 102 is configured to determine whether the current and/or power draw of the fuel cell stack 12 is greater than a threshold current value. If the fuel cell stack 12 current draw is greater than the threshold current value, the fuel cell system controller 102 is configured to, at block 510, ramp down the allowed current and/or power draw at a predefined ramp down rate. An exemplary predefined ramp down rate is at or about 50 A per second. The threshold current value may be about 30 A. In response to the fuel cell stack 12 current draw being less than the threshold current value, the fuel cell system controller 102, at block 512, limits the allowed current and/or power draw to a predefined value. The predefined value may be about 5 A.

At block 514, the fuel cell system controller 102 determines a desired air flow and sends a desired air flow request signal. The desired air flow is adjusted to a different amount than what the air flow is during the regular operation of the fuel cell stack 12, according to the condition that the fuel cell stack 12 is in the recovery state. As one example, in the recovery state, the fuel cell system controller 102 may be configured to increase the air flow request by about 20%.

The fuel cell system controller 102, at block 516, determines a desired purge valve open period and a desired purge valve close period. As an example, the fuel cell system controller 102 is configured to increase the purge valve open period to about 15 seconds. The desired purge valve close period may be determined based on a lookup table including time period values and current density values. The fuel cell system controller 102 then operates a purge valve of the fuel cell system 200, at block 518, according to the desired purge valve open period and the desired purge valve close period. The process 500 may then end.

Figure 6:
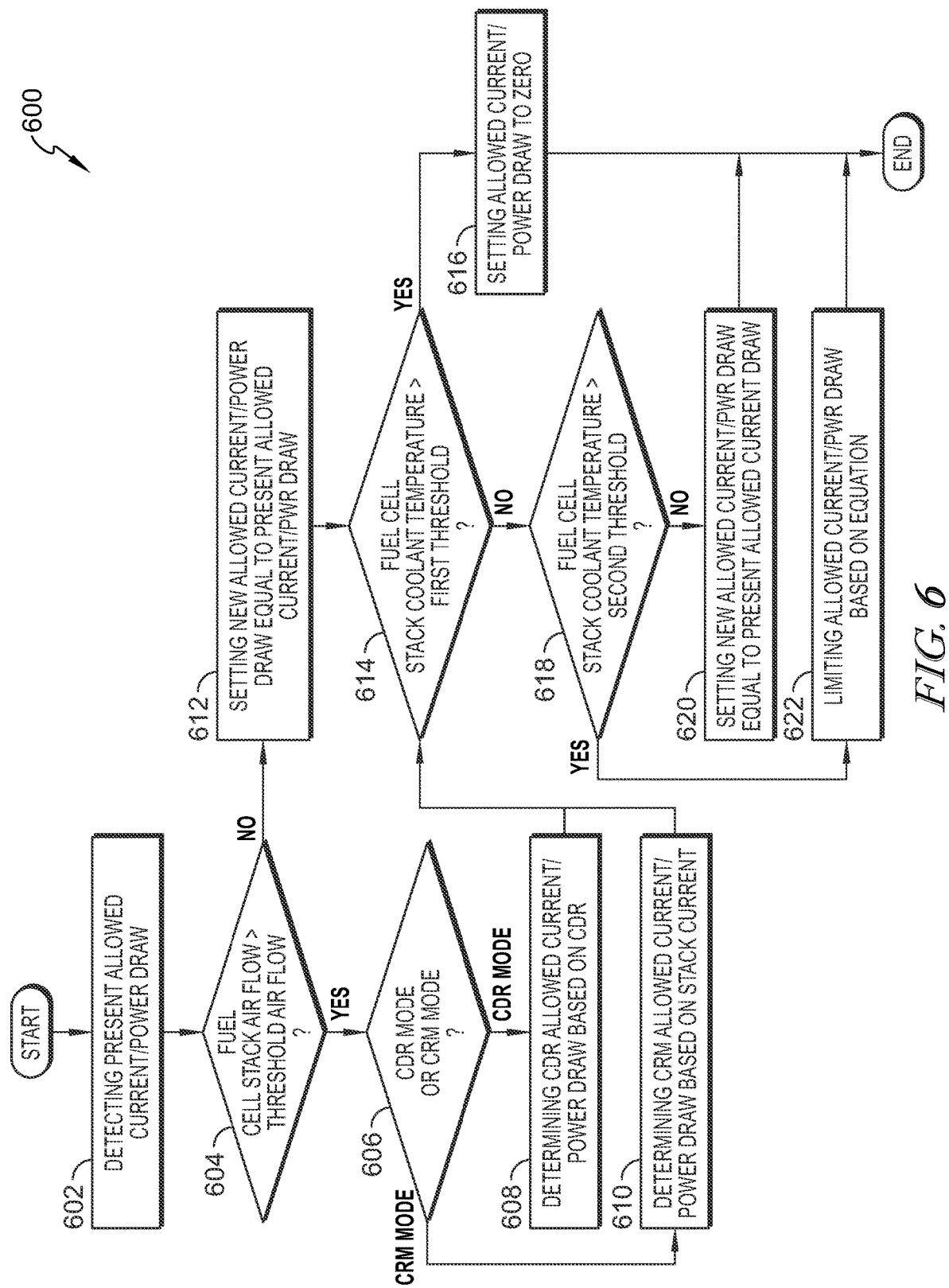
FIG. 6 illustrates an example process for dynamically adjusting an allowed current and power draw based on a coolant temperature of the fuel cell stack of FIGS. 1A-1D.

FIG. 6 illustrates an example process 600 for dynamically adjusting the allowed current and/or power draw of the fuel cell stack 12 based on a coolant temperature of the fuel cell stack 12. To generate a reliable power level, the fuel cell system 200 may be configured to rely on stable environment factors such as temperature, pressure, air 34 and hydrogen 32 flow, and/or other factors. In some instances, the fuel cell system controller 102 is configured to dynamically adjust the allowed current and/or power draw to limit the allowed current and/or power draw in order to maintain a temperature of the fuel cell stack 12. The fuel cell system controller 102 is configured to adjust the temperature of the fuel cell stack 12. The fuel cell system controller 102 may be configured to apply a different adjustment strategy depending on the coolant temperature of the fuel cell stack 12.

The process 600 begins at block 602 where the fuel cell system controller 102 detects the present allowed current and/or power draw of the fuel cell stack 12. In some instances, the present allowed current and/or power draw may be obtained as a result of process 500. In other instances, the present allowed current and/or power draw may be obtained as a result of process 400. The fuel cell system controller 102 determines at block 604 whether fuel cell stack 12 air flow is greater than a threshold air flow. In response to determining that the fuel cell stack 12 air flow is greater than the threshold air flow, the fuel cell system controller 102, at block 606, determines operating parameters for a current ramp mode (CRM) and a current and/or power draw request (CDR) mode.

In both operating modes (i.e., CRM and CDR), the fuel cell system controller 102 is configured to send one or more signals regarding the allowed current and/or power draw stating how much current is allowed to be drawn from the fuel cell 20. In the current ramp mode (CRM), the fuel cell system controller 102, at block 610, monitors the current output of the fuel cell stack 12 to maintain the allowed current and/or power draw. To maintain the allowed current and/or power mode, the fuel cell system controller 102 ramps up the power consumption so that it is equivalent to the allowed current and/or power draw level. In the current and/or power draw request mode (CDR), the fuel cell system controller 102, at block 608, may be used in a closed loop mode on current demand to match a current request.

In response to determining that the fuel cell stack 12 air flow is less than the threshold air flow in block 604, the fuel cell system controller 102, at block 612, sets a new allowed current and/or power draw equal to the present allowed current and/or power draw determined in block 602. At block 614, the fuel cell system controller 102 determines whether a coolant temperature of the fuel cell stack 12 is greater than a first threshold temperature value. The first threshold temperature value may be around about 80° C. If the coolant temperature is greater than the first threshold temperature value, then the fuel cell system controller 102, at block 616, sets the allowed current and/or power draw to zero. The coolant temperature being greater than the first threshold temperature value indicates that the coolant temperature is in the fault range.

If the coolant temperature is less than the first threshold temperature value, the fuel cell system controller 102, at block 618, determines whether the coolant temperature of the fuel cell stack 12 is greater than a second threshold temperature value. The second threshold temperature value is less than the first threshold temperature value. The second threshold temperature value may be around about 75° C. If the coolant temperature is less than the second threshold temperature value, then the coolant temperature is said to be in the stable range, indicating that the coolant temperature is less than both the first threshold temperature value and the second threshold temperature value. If the coolant temperature is less than the second threshold temperature value, then the fuel cell system controller 102, at block 620, sets the allowed current and/or power draw equal to the value acquired at block 602.

If the coolant temperature is greater than the second threshold temperature value, then the coolant temperature is said to be in the warning range, indicating that the coolant temperature is between the first threshold temperature value and the second threshold temperature value. If the coolant temperature is greater than the second threshold temperature value, the fuel cell system controller 102, at block 622, limits the allowed current and/or power draw. The allowed current and/or power draw is set and limited based on the following equation:

$$\text{Maxiumum stack current} \times \left( \frac{1 - (\text{coolant temperature} - \text{second threshold temperature value})}{\text{first thrshold temperature value} - \text{second threshold temperature value}} \right)$$

Figure 7:
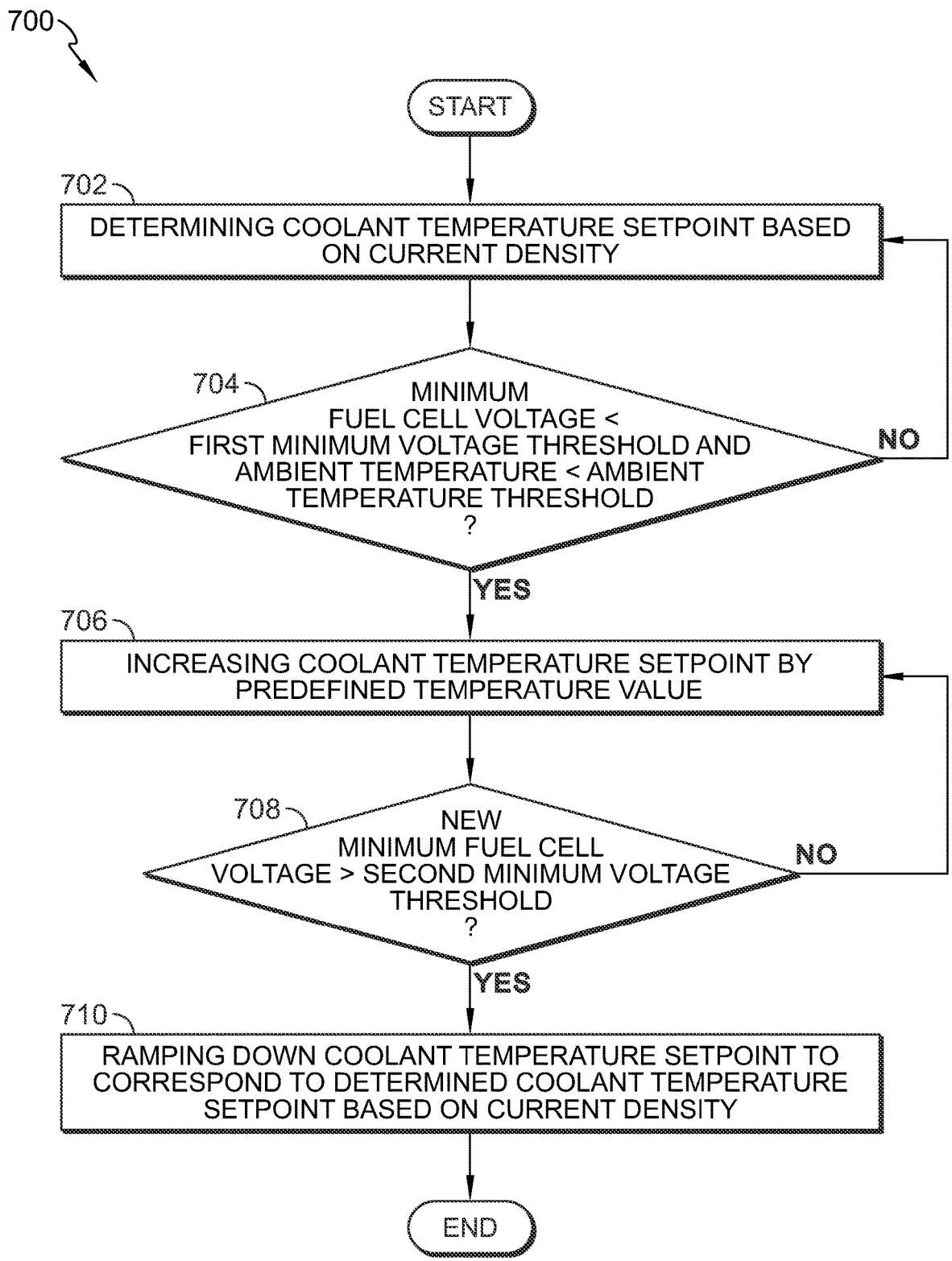
FIG. 7 illustrates an example process for dynamically adjusting the fuel cell stack coolant temperature based on a minimum fuel cell voltage of the fuel cells of the fuel cell stack of FIGS. 1A-1D.

FIG. 7 illustrates an example process 700 for dynamically adjusting the fuel cell stack 12 coolant temperature based on a minimum fuel cell voltage of the fuel cells 20 of the fuel cell stack 12. In one example, the fuel cell system controller 102 is configured to use a lookup table that maps values of the allowed current and/or power draw to corresponding coolant temperature set points. In order to prevent fell cell starvation, the fuel cell system controller 102 is configured to adjust the coolant temperature set point based on a measured or estimated minimum fuel cell voltage.

The fuel cell system controller 102, at block 702, is configured to determine a coolant temperature set point based on the current density of the fuel cell 20. In one example, the fuel cell system controller 102 is configured to reference a lookup table that maps corresponding values of coolant temperature set points to current densities.

At block 704, the fuel cell system controller 102 determines whether the fuel cell stack 12 is in a low temperature condition and whether the minimum fuel cell voltage is less than a first minimum voltage threshold. The fuel cell stack 12 may be in the low temperature condition if an ambient temperature is less than an ambient temperature threshold. The ambient temperature threshold may be a temperature that is about less than one of 18° C., 19° C., 20° C., 21° C., 22° C., 23° C., and so on. The first minimum voltage threshold may be about less than one of 0.1 V, 0.2 V, 0.3 V, 0.4 V, 0.5 V, and so on. If the fuel cell stack 12 is not in the low temperature condition, such as, for example, the ambient temperature is greater than the ambient temperature threshold, or if the minimum fuel cell voltage is greater than the first minimum voltage threshold, the fuel cell system controller 102 returns to block 702 and maintains the coolant temperature set point of the fuel cell stack 12.

In response to both the fuel cell stack 12 being in the low temperature condition, such as, for example, the ambient temperature being less than the ambient temperature threshold, and the minimum fuel cell voltage being less than the first minimum voltage threshold, the fuel cell system controller 102, at block 706, is configured to increase the coolant temperature set point by a predefined temperature value. The predefined temperature value is a number of degrees, such as 1° C., 2° C., 3° C., 4° C., 5° C., and so on.

While operating the fuel cell stack 12 at the increased coolant temperature (e.g., the coolant temperature set point plus the predefined temperature value), the fuel cell system controller 102, at block 708, determines whether an efficiency of the fuel cell stack 12 has increased. Fuel cell stack 12 efficiency may be determined by deviations between a reversible potential of the fuel cell 20 and the polarization curve of that fuel cell 20.

In one example, to determine whether the fuel cell stack 12 efficiency has increased, the fuel cell system controller 102 determines whether a new minimum fuel cell voltage at the increased coolant temperature is greater than a second minimum voltage threshold. The second minimum voltage threshold is greater than the first minimum voltage threshold. The second minimum voltage threshold may be about 0.48 V. In another embodiment, the second minimum voltage threshold may be about 0.42 V. If the new minimum fuel cell voltage is less than the second minimum voltage threshold, the fuel cell system controller 102 returns to block 706 and continues to operate the fuel cell stack 12 at the increased coolant temperature in response to determining that the efficiency of the fuel cell stack 12 did not increase.

In response to determining that the fuel cell stack 12 is in a better efficiency status, meaning the fuel cell system controller 102 determines that the new minimum fuel cell voltage is greater than the second minimum voltage threshold, the fuel cell system controller 102, at block 710, ramps down the coolant temperature set point to the set point acquired from the lookup table, e.g., the coolant temperature set point determined at block 702. The process 700 may then end.

Figure 8:
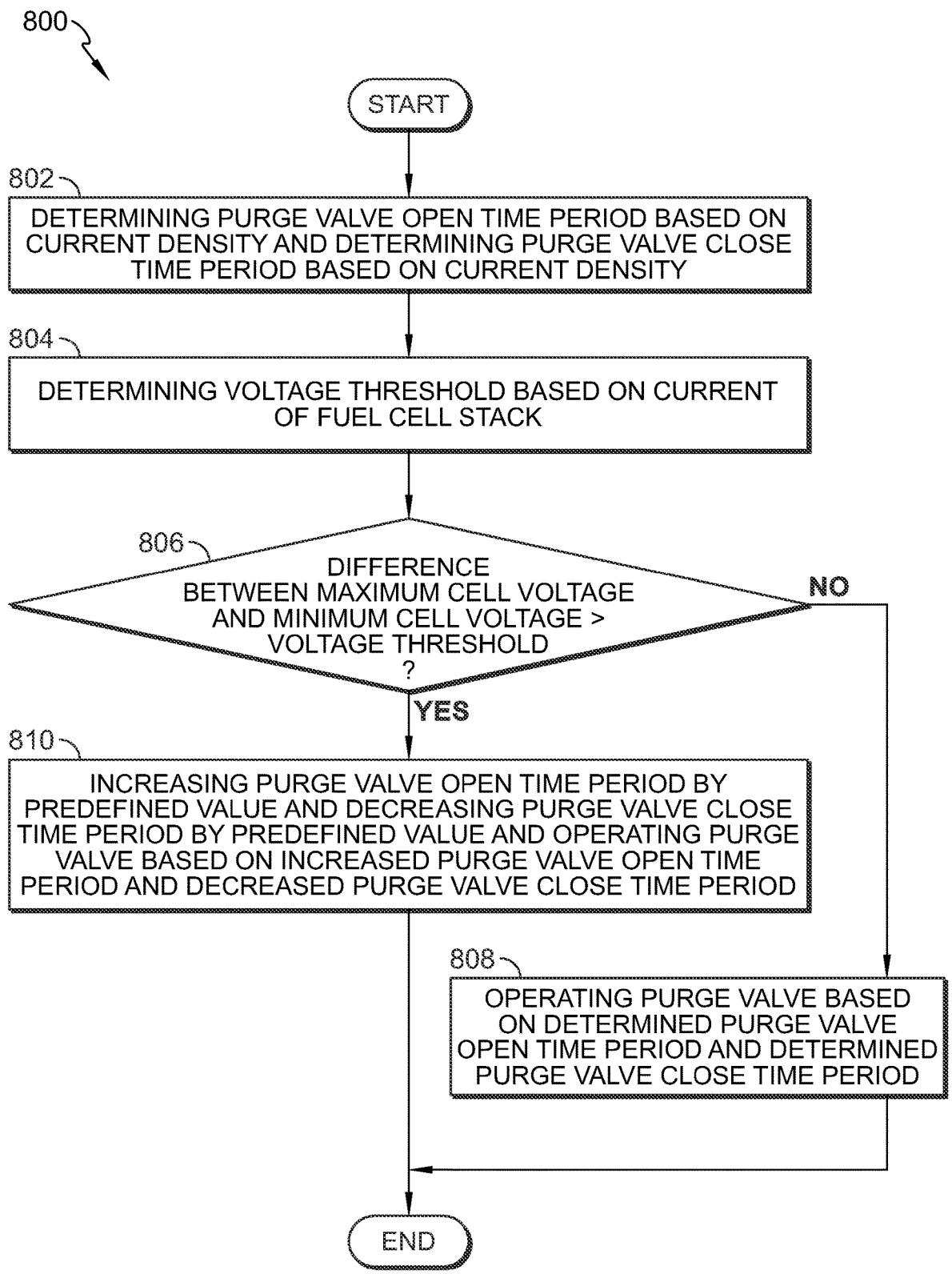
FIG. 8 illustrates an example process for dynamically adjusting a purge valve open time and a purge valve close time based on a difference between a maximum fuel cell voltage and a minimum fuel cell voltage of the fuel cells of the fuel cell stack of FIGS. 1A-1D.

FIG. 8 illustrates an example process 800 for dynamically adjusting a purge valve open time and a purge valve close time based on a difference between a maximum fuel cell voltage and a minimum fuel cell voltage of the fuel cells 20 of the fuel cell stack 12. The amount of water and/or moisture condensed inside the fuel cell stack 12 affects the efficiency of the fuel cells 20. Determining if the fuel cell 20 is operating at a low efficiency may be observed by monitoring a deviation of (or difference between) a measured or estimated actual fuel cell voltage from an expected fuel cell voltage in accordance with the polarization curve of the fuel cell 20. The fuel cell system controller 102 may be configured to reference one or more lookup tables to determine whether a deviation threshold has been exceeded. The fuel cell system controller 102 may be configured to dynamically adjust the purge valve open time and the purge valve close time. The adjustment of the purge valve operation by the fuel cell system controller 102 may assist in eliminating the water and/or moisture inside the fuel cell stack 12 to restore the efficiency of the fuel cell stack 12.

The process 800 may begin at block 802 where the fuel cell system controller 102 determines (e.g., using a corresponding lookup table) a purge valve open time period with respect to the current density of the fuel cell 20. The fuel cell system controller 102 determines, also at block 802, (e.g., using a corresponding lookup table) a purge valve close time period with respect to the current density of the fuel cell 20. The fuel cell system controller 102 determines, at block 804, a voltage threshold corresponding to the current of the fuel cell stack 12. The fuel cell system controller 102 uses a lookup table based on the fuel cell stack 12 current at block 804.

At block 806, the fuel cell system controller 102 determines whether a difference between the maximum fuel cell voltage and the minimum fuel cell voltage is greater than the voltage threshold determined at block 804. In response to detecting that the variance of the fuel cell voltages, such as the difference of maximum and minimum fuel cell voltage, is less than the voltage threshold, the fuel cell system controller 102, at block 808, operates the purge valve based on the purge valve open time period and the purge valve close time period determined using the lookup table at block 802. In response to detecting that the variance of the fuel cell voltages, such as the difference of maximum and minimum fuel cell voltage, is greater than the voltage threshold, the fuel cell system controller 102, at block 810, increases the purge valve open time period by a predefined open value and decreases the purge valve close time period by a predefined close value. The predefined open value may range from about 15% to 30% of the purge valve open time period, including any specific number or range of number comprised therein. The predefined close value may be about 50% of the purge valve close time period. The purge valve will then operate based on the increased purge valve open time period and the decreased purge valve close time period. The process 800 may then end.

Of course, different maximum and minimum voltage thresholds and/or minimum fuel cell voltages may result in different purge frequencies with a duty cycle band. Different maximum and minimum voltage thresholds and/or minimum fuel cell voltages may result in different cathode stoichiometry set points within a +/− band. Examples of base stoic values include +0.5 and −0.2.

The following described aspects of the present invention are contemplated and non-limiting:

A first aspect of the present invention relates to a system. The system comprises a fuel cell stack including a plurality of fuel cells and a controller. The controller is configured to determine a current density of the fuel cell stack, determine a threshold voltage value based on a polarization curve of the fuel cell stack, and compare a measured average fuel cell voltage value and the threshold voltage value. The controller is configured to, in response to the measured average fuel cell voltage value being greater than the threshold voltage value, set an allowed current and power draw of the fuel cell stack at a first predefined threshold value. The controller is configured to in response to the measured average fuel cell voltage value being less than the threshold voltage value, set the allowed current and power draw of the fuel cell stack at a second predefined threshold value. The first predefined threshold value is greater than the second predefined threshold value.

A second aspect of the present invention relates to a method. The method comprises providing a fuel cell stack including a plurality of fuel cells and a controller communicatively coupled to the fuel cell stack, determining a current density of the fuel cell stack, determining a threshold voltage value, comparing a measured average fuel cell voltage value to the threshold voltage value. In response to the measured average fuel cell voltage value being greater than the threshold voltage value, the method comprises setting an allowed current and power draw of the fuel cell stack at a first predefined value. In response to the measured average fuel cell voltage value being less than the threshold voltage value, the method comprises setting the allowed current and power draw of the fuel cell stack at a second predefined value, wherein the first predefined value is greater than the second predefined value. The method further comprises measuring a coolant temperature of the fuel cell stack.

A third aspect of the present invention relates to a method. The method comprises providing a fuel cell stack and a controller in communication with the fuel cell stack, determining a current density of the fuel cell stack, determining a first minimum threshold voltage value of the fuel cell stack, determining an ambient temperature threshold, determining a coolant temperature set point of the fuel cell stack based on the current density of the fuel cell stack, comparing a measured minimum fuel cell voltage value to the first minimum threshold voltage value. The method further comprises, in response to the measured minimum fuel cell voltage value being less than the first minimum threshold voltage value and an ambient temperature being less than the ambient temperature threshold, increasing the coolant temperature set point of the fuel cell stack by a predefined value to correspond to an increased coolant temperature set point. The method further comprises, in response to the measured minimum fuel cell voltage value being greater than the first minimum threshold voltage value or the ambient temperature being greater than the ambient temperature threshold, maintaining the coolant temperature set point.

In the first aspect of the present invention, the polarization curve of the fuel cell stack may be determined at the time of manufacturing of the fuel cell stack. In the first aspect of the present invention, in response to a measured minimum fuel cell voltage being less than a minimum threshold voltage value, the fuel cell stack may enter a recovery state. In the first aspect of the present invention, after entering the recovery state, the controller may be configured to determine whether the allowed current and power draw of the fuel cell stack is greater than a threshold current value.

In the first aspect of the present invention, in response to the allowed current and power draw of the fuel cell stack being greater than the threshold current value, the controller may be configured to set a ramp down rate to periodically lower the allowed current and power draw of the fuel cell stack. In the first aspect of the present invention, in response to the allowed current and power draw of the fuel cell stack being less than the threshold current value, the controller may be configured to lower the allowed current and power draw of the fuel cell stack. In the first aspect of the present invention, after entering the recovery state, the controller may be configured to increase an air flow to the fuel cell stack.

In the first aspect of the present invention, the threshold voltage value may be determined using a polarization curve of the fuel cell stack statistically determined at the time of manufacturing of the fuel cell stack. In the first aspect of the present invention, the method may further comprise, in response to the coolant temperature of the fuel cell stack being greater than a first threshold temperature value, setting the allowed current and power draw of the fuel cell stack to zero.

In the second aspect of the present invention, the method may further comprise, in response to the coolant temperature of the fuel cell stack being less than the first threshold temperature value and being greater than a second threshold temperature value, wherein the second threshold temperature value is less than the first threshold temperature value, lowering the allowed current and power draw of the fuel cell stack. In the second aspect of the present invention, the method may further comprise, in response to the coolant temperature of the fuel cell stack being less than the first threshold temperature value and the second threshold temperature value, maintaining the allowed current and power draw of the fuel cell stack.

In the second aspect of the present invention, lowering the allowed current and power draw of the fuel cell stack may include calculating a product of a maximum fuel cell stack current and a ratio of a difference between the coolant temperature and the second threshold temperature value and a difference between the first threshold temperature value and the second threshold temperature value.

In the third aspect of the present invention, the method may further comprise determining if an efficiency of the fuel cell stack improved after the coolant temperature set point is increased to the increased coolant temperature set point. In the third aspect of the present invention, the efficiency of the fuel cell stack may improve if a measured minimum fuel cell voltage of the fuel cell stack at the increased coolant temperature set point is greater than a second minimum threshold voltage value, the second minimum threshold voltage value being greater than first minimum threshold voltage value.

In the third aspect of the present invention, the method may further comprise lowering the increased coolant temperature set point to the coolant temperature set point if the efficiency of the fuel cell stack improved. In the third aspect of the present invention, the method may further comprise determining a purge valve open time period, a purge valve close time period, and a threshold voltage variance based on a lookup table including current density values.

In the third aspect of the present invention, the method may further comprise determining a difference between a measured maximum fuel cell voltage and the measured minimum fuel cell voltage, and in response to the difference between the measured maximum fuel cell voltage and the measured minimum fuel cell voltage being greater than the threshold voltage variance, increasing the purge valve open time period and decreasing the purge valve close time period. In the third aspect of the present invention, the method may further comprise, in response to the difference between the measured maximum fuel cell voltage and the measured minimum fuel cell voltage being less than the threshold voltage variance, operating a purge valve based on the purge valve open time period and the purge valve close time period.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system comprising:
a fuel cell stack including a plurality of fuel cells,
a controller configured to:
determine a current density of the fuel cell stack,
determine a threshold voltage value based on a polarization curve of the fuel cell stack, and
compare a measured average fuel cell voltage value and the threshold voltage value,
wherein the controller is configured to:
in response to the measured average fuel cell voltage value being greater than the threshold voltage value, set an allowed current and power draw of the fuel cell stack at a first predefined threshold value, and
in response to the measured average fuel cell voltage value being less than the threshold voltage value, set the allowed current and power draw of the fuel cell stack at a second predefined threshold value, wherein the first predefined threshold value is greater than the second predefined threshold value.

2. The system of claim 1, wherein the polarization curve of the fuel cell stack is determined at the time of manufacturing of the fuel cell stack.

3. The system of claim 1, wherein in response to a measured minimum fuel cell voltage being less than a minimum threshold voltage value, the fuel cell stack enters a recovery state.

4. The system of claim 3, wherein after entering the recovery state, the controller is configured to determine whether the allowed current and power draw of the fuel cell stack is greater than a threshold current value.

5. The system of claim 4, wherein in response to the allowed current and power draw of the fuel cell stack being greater than the threshold current value, the controller is configured to set a ramp down rate to periodically lower the allowed current and power draw of the fuel cell stack.

6. The system of claim 4, wherein in response to the allowed current and power draw of the fuel cell stack being less than the threshold current value, the controller is configured to lower the allowed current and power draw of the fuel cell stack.

7. The system of claim 3, wherein after entering the recovery state, the controller is configured to increase an air flow to the fuel cell stack.

8. A method comprising:
providing a fuel cell stack including a plurality of fuel cells and a controller communicatively coupled to the fuel cell stack,
determining a current density of the fuel cell stack,
determining a threshold voltage value, comparing a measured average fuel cell voltage value to the threshold voltage value, in response to the measured average fuel cell voltage value being greater than the threshold voltage value, setting an allowed current and power draw of the fuel cell stack at a first predefined value, in response to the measured average fuel cell voltage value being less than the threshold voltage value, setting the allowed current and power draw of the fuel cell stack at a second predefined value, wherein the first predefined value is greater than the second predefined value, and measuring a coolant temperature of the fuel cell stack.

9. The method of claim 8, wherein the threshold voltage value is determined using a polarization curve of the fuel cell stack statistically determined at the time of manufacturing of the fuel cell stack.

10. The method of claim 8, further comprising, in response to the coolant temperature of the fuel cell stack being greater than a first threshold temperature value, setting the allowed current and power draw of the fuel cell stack to zero.

11. The method of claim 10, further comprising, in response to the coolant temperature of the fuel cell stack being less than the first threshold temperature value and being greater than a second threshold temperature value, wherein the second threshold temperature value is less than the first threshold temperature value, lowering the allowed current and power draw of the fuel cell stack.

12. The method of claim 11, further comprising, in response to the coolant temperature of the fuel cell stack being less than the first threshold temperature value and the second threshold temperature value, maintaining the allowed current and power draw of the fuel cell stack.

13. The method of claim 11, wherein lowering the allowed current and power draw of the fuel cell stack includes calculating a product of a maximum fuel cell stack current and a ratio of a difference between the coolant temperature and the second threshold temperature value and a difference between the first threshold temperature value and the second threshold temperature value.

14. A method comprising:

providing a fuel cell stack and a controller in communication with the fuel cell stack, determining a current density of the fuel cell stack, determining a first minimum threshold voltage value of the fuel cell stack, determining an ambient temperature threshold, determining a coolant temperature set point of the fuel cell stack based on the current density of the fuel cell stack, comparing a measured minimum fuel cell voltage value to the first minimum threshold voltage value, in response to the measured minimum fuel cell voltage value being less than the first minimum threshold voltage value and an ambient temperature being less than the ambient temperature threshold, increasing the coolant temperature set point of the fuel cell stack by a predefined value to correspond to an increased coolant temperature set point, and in response to the measured minimum fuel cell voltage value being greater than the first minimum threshold voltage value or the ambient temperature being greater than the ambient temperature threshold, maintaining the coolant temperature set point.

15. The method of claim 14, further comprising determining if an efficiency of the fuel cell stack improved after the coolant temperature set point is increased to the increased coolant temperature set point.

16. The method of claim 15, wherein the efficiency of the fuel cell stack improves if a measured minimum fuel cell voltage of the fuel cell stack at the increased coolant temperature set point is greater than a second minimum threshold voltage value, the second minimum threshold voltage value being greater than first minimum threshold voltage value.

17. The method of claim 16, further comprising lowering the increased coolant temperature set point to the coolant temperature set point if the efficiency of the fuel cell stack improved.

18. The method of claim 14, further comprising determining a purge valve open time period, a purge valve close time period, and a threshold voltage variance based on a lookup table including current density values.

19. The method of claim 18, further comprising determining a difference between a measured maximum fuel cell voltage and the measured minimum fuel cell voltage, and in response to the difference between the measured maximum fuel cell voltage and the measured minimum fuel cell voltage being greater than the threshold voltage variance, increasing the purge valve open time period and decreasing the purge valve close time period.

20. The method of claim 19, further comprising, in response to the difference between the measured maximum fuel cell voltage and the measured minimum fuel cell voltage being less than the threshold voltage variance, operating a purge valve based on the purge valve open time period and the purge valve close time period.

* * * * *